United States Patent [19]

Papagni

[11] 4,355,708

[45] Oct. 26, 1982

[54] DISC BRAKES

[75] Inventor: Robert P. Papagni, St. Remy-les-Chevreuse, France

[73] Assignees: S. A. Automobiles Citroen; S. A. Automobiles Peugeot, both of Paris, France

[21] Appl. No.: 173,455

[22] Filed: Jul. 30, 1980

Related U.S. Application Data

[63] Continuation of Ser. No. 961,500, Nov. 17, 1978, abandoned.

[30] Foreign Application Priority Data

Nov. 23, 1977 [FR] France .............................. 77 35976

[51] Int. Cl.³ .............................................. F16D 65/56
[52] U.S. Cl. .................................. 188/196 D; 188/71.9
[58] Field of Search ............... 188/71.9, 72.6, 196 D, 188/196 BA

[56] References Cited

U.S. PATENT DOCUMENTS

| | | | |
|---|---|---|---|
| 3,820,635 | 6/1974 | Hurt | 188/71.9 |
| 3,835,961 | 9/1974 | Troester et al. | 188/71.9 |
| 4,006,802 | 2/1977 | Evans | 188/196 D |

Primary Examiner—Duane A. Reger
Attorney, Agent, or Firm—Karl F. Ross

[57] ABSTRACT

A disc brake comprises an operating piston mounted in a cylinder rigid with a stirrup. The piston is movable in the cylinder to cause axial movement of friction linings under the action of hydraulic pressure or the force of a mechanical brake actuator. An operating clearance is provided to allow a limited retraction of the friction linings when the hydraulic pressure or the mechanical actuating force is released. The mechanical actuator comprises a screw rotatable in the cylinder. A nut engaged by the screw is connected to the piston by a unidirectional coupling device comprising teeth on the nut co-operating with teeth on a ring fixed for rotation with the piston. The nut is mounted for translatory movement in relation to the piston solely through a limited distance corresponding to the operating clearance, and the ring is mounted for axial displacement relative to the piston. This construction provides for automatic adjustment for wear of the linings and obviates transmission of the mechanical braking force through the teeth which would be liable to break.

2 Claims, 2 Drawing Figures

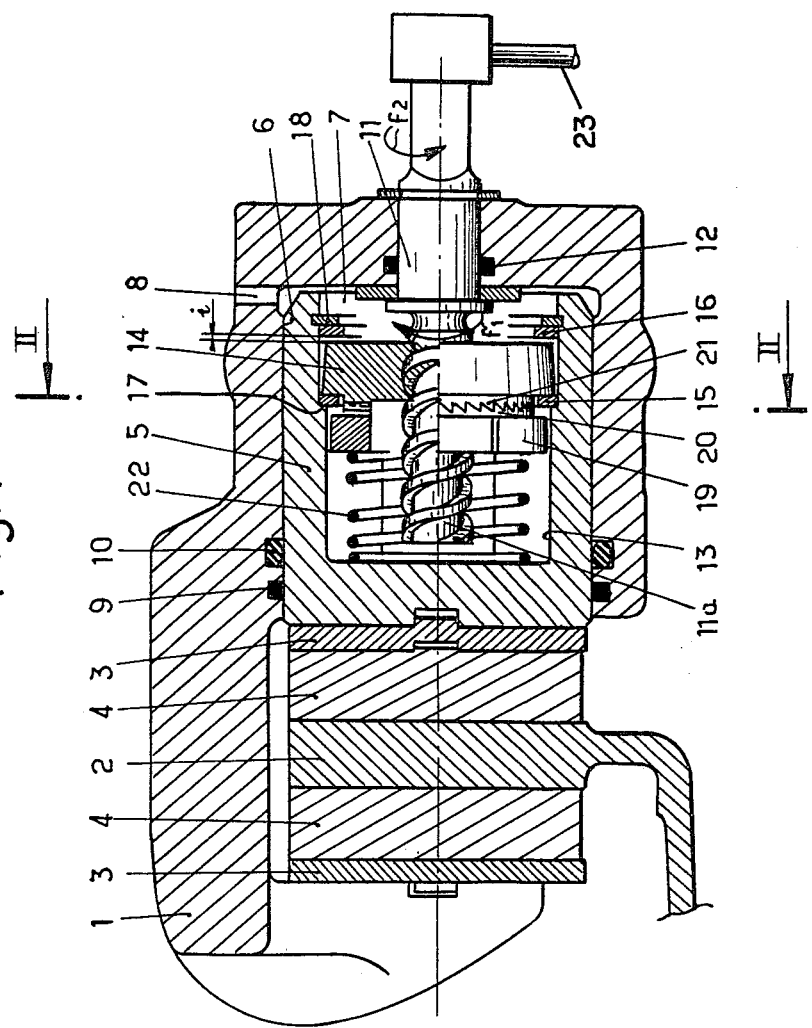

DISC BRAKES

This is a continuation of application Ser. No. 961,500, filed Nov. 17, 1978, now abandoned.

FIELD OF THE INVENTION

My present invention relates to disc brakes.

DESCRIPTION OF THE PRIOR ART

There have been proposed disc brakes comprising a stirrup or yoke disposed astride a disc on either side of which there are friction linings adapted to be displaced axially by at least one piston mounted to slide in a cylinder rigid with the stirrup, either under the action of hydraulic pressure or by a mechanical actuator. An operating clearance is provided to allow a restricted retraction of the friction linings when the hydraulic pressure or mechanical actuating force is released.

It is customary to provide disc brakes of this type with a device which automatically compensates for clearances due to wear of the friction linings. In particular, in such disc brakes the mechanical actuator may comprise a large-pitch screw mounted for rotation in the cylinder and a nut engaged by this screw and connected to the piston by a coupling device constituted by first and second ratchet teeth respectively provided on confronting faces of the nut and of a locking ring which is coupled with the piston for joint rotation. In one such disc brake, the locking ring is fixed in relation to the piston while the nut is capable of axial movement in relation to the piston. With this arrangement, upon mechanical operation of the brake which causes rotation of the screw, the actuating force is transmitted to the brake via the toothed coupling, which can result in fracture of the teeth.

OBJECT OF THE INVENTION

The object of my present invention, therefore, is to provide an improved disc brake obviating the drawback just referred to.

SUMMARY OF THE INVENTION

I realize this object, in accordance with my present invention, by making the aforementioned locking ring axially movable in the hollow piston and separating that ring from the closed end of the piston by a compression spring tending to maintain the confronting faces of the ring and the nut in contact with each other, the piston being provided with abutment means enabling limited relative axial displacement of the nut between two positions which are separated by an operating clearance; the large-pitch screw, on the other hand, is axially nonshiftable relatively to the disc-straddling yoke which forms the piston cylinder.

Pursuant to a more specific feature of my invention, the abutment means may comprise a first member, engaged by the nut upon rotation of the large-pitch screw by the mechanical brake actuator for axially entraining the piston, and a second member engaged by the nut upon fluidic displacement of the piston for axially entraining that nut.

BRIEF DESCRIPTION OF THE DRAWINGS

An embodiment of the invention will now be described, by way of example only, with reference to the accompanying drawing, in which:

FIG. 1 is a section of a disc brake according to the invention, the brake being shown in its inoperative mode; and FIG. 2 is a cross-section taken along line II—II of FIG. 1.

DESCRIPTION OF THE PREFERRED EMBODIMENT

FIG. 1 shows a disc brake comprising a stirrup or yoke 1 disposed astride a disc 2 which is fixed to a rotating element for example, the wheel of a vehicle (not shown). On both sides of the disc 2 there are plates 3 each of which carries a friction lining 4. The plates 3, with their linings 4, can be displaced axially of the disc by at least one piston 5 so as to clamp the disc between them.

The piston 5 is slidable in a cylinder 6 formed by the stirrup 1 and defines therewith a chamber 7 which can be supplied with pressurized fluid through a passage 8. A fluid-tight seal 9 and a compensating seal 10 are interposed between the piston 5 and the cylinder 6.

A reversible large-pitch screw 11 is mounted for rotation in the stirrup 1 with an interposed seal 12, the screw 11 being held against axial movement with respect to the stirrup. A lever 23 for operating the brake by hand is linked to the screw 11 to rotate same.

The piston 5 has a bore 13 defining a hollow interior and accommodating the threaded part 11a of the screw 11. Engaged by this threaded part is a nut 14 which is axially entrained by the piston 5, with a certain operating clearance i, by two abutments (e.g. friction washers) 15 and 16 disposed on opposite sides of the nut 14, members 15 and 16 respectively abutting against an internal shoulder 17 of the piston and a circlip 18 fitted into the piston.

The bore 13 of the piston is cylindrical in that part thereof which extends between the shoulder 17 and the open rear end of the piston. However, the part of the bore which extends between the shoulder 17 and the closed front end of the piston is prismatic and has, for example, a hexagonal cross-section. A locking ring 19 in the prismatic part of the bore 13 has a peripheral outline complementary to that of the bore and therefore cannot turn in relation to the piston. The rear face of the ring 19 has a set of ratchet teeth 20 arranged to co-operate with a set of ratchet teeth 21 on the front face of the nut. A spring 22 interposed between the closed end of the piston 5 and the ring 19 tends to maintain the two serrations 20 and 21 in engagement. These serrations constitute a unidirectional coupling between the nut 14 and the piston 5; the teeth are so arranged relative to the screw thread 11a that the nut 14 can rotate in relation to the ring 19 in the direction of the arrow $f_1$ opposite to that of arrow $f_2$ which is the direction in which the screw 11 is driven to effect mechanical operation of the brake.

The disc brake which has just been described functions in the following way:

Upon hydraulic operation of the brake, the pressure generated in the chamber 7 moves the piston 5 towards the disc 2 which is thus clamped between the friction linings 4.

When there is wear on the linings 4, the piston 5 drives through washer 16 the nut 14 which rotates about the threaded part 11a of the screw 11 in the direction of the arrow $f_1$. If, owing to the wear, the axial displacement of the piston is greater than the operating clearance i plus the depth of one tooth of the unidirectional ratchet coupling 20, 21, the nut 14 rotates by one tooth in relation to the ring 19.

When the brake is released by the driver, the piston 5 moves back by an amount equal to the clearances between the various elements and is arrested by the nut 14 which is prevented from turning by the unidirectional coupling.

When the driver operates the manual brake lever 23, the screw 11 is caused to rotate in the stirrup 1 in the direction of the arrow $f_2$, contrary to that of the arrow $f_1$. As the nut 14 is prevented from rotating in this direction by the unidirectional coupling, the nut 14 moves in a translatory sense on the screw 11a, entraining the piston 5 through the washer 15. The disc 2 is thus clamped between the linings 4. When this operation takes place, the force is transmitted directly from the nut 14 to the piston 5 without passing through the teeth, thus overcoming the problems associated with the known arrangement as discussed earlier.

When the brake is released, the screw 11 turns in the opposite direction which restores the various elements to their initial positions.

The prismatic bore in the piston may be made by shaping, by hot or cold forging or by extrusion.

What is claimed is:

1. In a disc brake wherein a yoke straddling a disc forms a cylinder in which a hollow piston with an open end remote from the disc and a closed end proximal to the disc is axially displaceable under fluid pressure toward said disc to clamp the latter between a pair of friction linings respectively carried by the piston and by the yoke, there being further provided a mechanical brake actuator including a rotatable large-pitch screw extending axially within the cylinder and engaging a nut inside said piston adjoining an axially shiftable locking ring nonrotatably secured to the piston, said nut and said locking ring having confronting faces formed with interengaging first and second ratchet teeth, rotation of said screw in a predetermined direction causing an axial shaft of said nut toward said disc with entrainment of said piston, fluidic displacement of said piston toward said disc with said screw stationary causing relative rotation of said nut and said locking ring with compensation of wear of said linings by a realignment of their ratchet teeth, the improvement wherein said locking ring is separated from the closed end of said piston by a compression spring tending to maintain said confronting faces in contact with each other, said piston being provided with abutment means enabling limited relative axial displacement of said nut between two positions separated by an operating clearance, said screw being provided with means preventing axial displacement thereof relative to said yoke in all positions of said piston, said abutment means comprising a first ring on said piston engaged by said nut upon rotation of said screw for axially entraining said piston and a second ring engaged by said nut upon fluidic displacement of said piston for axially entraining said nut, said rings being axially spaced by a distance greater than the axial thickness of said nut.

2. A disc brake as defined in claim 1 wherein said actuator further comprises a hand lever linked with said nut.

* * * * *